UNITED STATES PATENT OFFICE.

WILLIAM S. MARSH, OF RAYMOND, WISCONSIN.

IMPROVEMENT IN PRESERVING EGGS.

Specification forming part of Letters Patent No. 121,640, dated December 5, 1871.

*To all whom it may concern:*

Be it known that I, WILLIAM S. MARSH, of Raymond, in the county of Racine and State of Wisconsin, have invented a new and Improved Method of Preserving Eggs, of which the following is a specification:

The invention consists in the application of alum and sulphur to the surface of eggs, as hereinafter fully described and subsequently claimed.

I take pure water, put one-third ounce of alum to the gallon therein, and then boil until the alum is dissolved. I now dip the eggs in the solution, place them on grates and fumigate them with sulphur. The aluminous liquid penetrates and fills up the pores of the shell, while the circumjacent sulphur forms an impenetrable barrier between the air and the aluminous solution. This prevents the evaporation of the latter, while the alum effectually prevents the sulphur from entering and imparting any unpleasant flavor to the contents of the egg.

Having thus described all that is necessary to a full understanding of my invention, what I esteem to be new, and desire to protect by Letters Patent, is—

The method of preserving eggs by the successive application thereto of alum and sulphur, in the manner described.

WM. S. MARSH.

Witnesses:
ERWIN A. MARSH,
DELOSS V. NEAR.

(58)